United States Patent [19]

Kawada et al.

[11] 4,319,177

[45] Mar. 9, 1982

[54] OPERATION CONTROL APPARATUS FOR AC MOTORS

[75] Inventors: Shigeki Kawada, Hino; Hiroshi Ishida, Hamuramachi, both of Japan

[73] Assignee: Fujitsu Fanuc Limited, Tokyo, Japan

[21] Appl. No.: 176,337

[22] Filed: Aug. 8, 1980

[51] Int. Cl.³ .............................................. H02P 5/40
[52] U.S. Cl. .................................. 318/798; 318/803; 318/811
[58] Field of Search ............... 318/798, 762, 806, 803, 318/808–811, 376; 363/56, 57

[56] References Cited

U.S. PATENT DOCUMENTS 3,536,984 10/1970 Rosenberry, Jr. ................... 318/808
3,821,630 6/1974 Fornrumpt et al. .................. 363/57

*Primary Examiner*—David Smith, Jr.
*Attorney, Agent, or Firm*—Staas and Halsey

[57] ABSTRACT

An apparatus for controlling the operation of an AC motor wherein braking energy at the time of a reduction in motor speed is disposed of by regenerative braking. The apparatus includes a rectifier which is connected to the AC power source, a DC link which includes smoothing capacitors and a regenerative transistor bridge circuit, a variable voltage-variable frequency inverter. Further provided are a diode which is connected between the rectifier and the transistor bridge circuit and which is biased in the reverse direction at the time of regenerative braking, and a firing control circuit for detecting the reverse bias voltage of the diode to control the firing of each transistor in the transistor bridge circuit, the braking energy being fed back to the AC power source when the AC motor undergoes a reduction in speed. The apparatus, which provides stable regenerative operation, can be constructed simply and inexpensively, and reduced in size.

9 Claims, 5 Drawing Figures

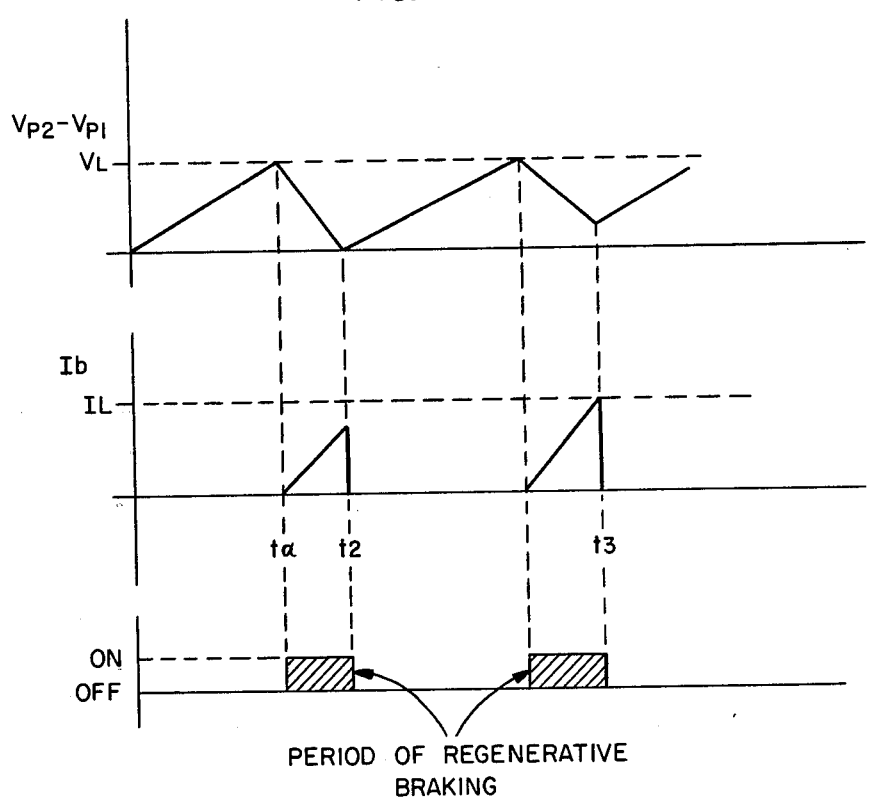

OPERATION CONTROL APPARATUS FOR AC MOTORS

BACKGROUND OF THE INVENTION

This invention relates to an apparatus for controlling the operation of an AC motor, and more particularly to an AC motor operation control apparatus having improved circuitry for regenerative braking.

AC motors, and induction motors in particular, are employed in a variety of industrial fields. The kinds of loads that can be driven by these motors are equally diverse. Some induction motors, for example, undergo rapid and frequent increases and decreases in speed, while in others there are positive and negative changes in load torque so as to permit the raising and lowering of an object in the manner of a hoist. Thus there is a requirement that an AC motor functioning as a driving source be operated so as to generate a positive torque as well as a braking torque.

A method of controlling the operation of AC motors which has recently come into fairly widespread use employs a variable voltage-variable frequency inverter. While no major problems are encountered in this method when operating the motor in the driving mode, one difficulty which does arise is the manner of dealing with the rotational energy possessed by the rotor of the motor when it is to be operated in the braking mode at the time of a reduction in speed. Two exemplary methods of dealing with this rotational energy have been adopted in the prior art. In one method the flow of current to the AC motor is interrupted at braking time to permit the motor to slow down naturally owing to mechanical loss attributed to the load. In the other method the slip which arises at the time of the speed reduction is suitably controlled and is allowed to dissipate within the motor. The first method, however, requires too much time to achieve the speed reduction and has a very poor control response, while the second method causes the motor to overheat to such an extent that it cannot endure frequent increases and decreases in speed. Another method which can be mentioned is one in which the rotational energy of the rotor is dissipated by allowing a smoothing capacitor, inserted in the inverter circuitry mentioned above, to charge until the charged voltage exceeds a specified value, whereupon the capacitor is discharged through a braking resistor connected in parallel with the inverter circuit, thereby to dissipate the energy. However, this method is disadvantageous in that it may lead to destruction of the apparatus if the smoothing capacitor is allowed to charge to an excessively high value, and because it is expensive since the braking resistor increases in size and cost in accordance with the size of the machine to be driven by the motor. Moreover, the method is undesirable in terms of enhancing efficiency because of the fact that the braking energy is wasted in the form of thermal loss.

A regenerative braking method, as shown in FIG. 1, has been proposed in an effort to improve upon the foregoing arrangements.

FIG. 1 is a circuit diagram showing an AC motor operation control apparatus of the regenerative braking type in accordance with the present invention. The apparatus includes an AC motor 1 such as a three-phase induction motor, a bridge-type rectifier 2 composed of diodes $D_1$ through $D_6$ for rectifying the U, V and W phases of the AC input power, a regenerative thyristor bridge circuit 3 comprising thyristors $S_1$ through $S_6$, a smoothing circuit 4 having capacitors $C_2$ and $C_3$ a variable voltage-variable frequency inverter 5 composed of transistors $TA_1$ through $TA_6$, a flywheel diode bridge circuit 6 comprising diodes $D_1'$ through $D_6'$, and a step-up transformer 7 for boosting the power source voltage. To control the induction motor 1 with this conventional arrangement, for example, to reduce the motor speed, the command speed is lowered to control the voltage and frequency of the variable voltage-variable frequency inverter 5, whereby the synchronous speed in conformance with the newly set frequency becomes smaller than that of motor speed, giving rise to a negative slip condition. Accordingly, the motor begins to run in the regenerative braking region, with the result that the voltage induced in the motor is rectified by the flywheel diode bridge circuit 6, serving as a rectifier, thereby raising the voltage on the DC line side. The smoothing capacitors $C_1$, $C_2$ and $C_3$, in order for them to exhibit the smoothing function, are charged to a voltage which is 1.3 to 1.4 times the AC power source voltage even when the motor is operating in the normal driving mode. Nevertheless, when the induction motor is operated in the regenerative region, the smoothing capacitors $C_2$, $C_3$ on the DC line side are particularly charged to, and held at, an even higher voltage. For example, if the AC power source voltage is 200 volts, the voltage to which the capacitor $C_1$ is charged is approximately 260 volts, and the voltage to which the smoothing capacitors $C_2$, $C_3$ is charged is raised to approximately 290 volts. Under such a condition, commutation cannot take place and regenerative operation is impossible because the AC power source voltage is lower than the voltage on the side of the DC line even if the firing of the regenerative thyristor bridge circuit 3 composed of the thyristors $S_1$ through $S_6$ is controlled. To avoid this inconvenience the step-up transformer 7 is inserted between the thyristor bridge circuit 3 and the AC power source, and the circuitry is arranged in such a manner that there will be intervals in which the AC power source voltage is always higher than the voltage on the DC line side, thereby to enable operation in the regenerative braking region while assuring commutation of the thyristors $S_1$ through $S_6$. However, the apparatus that employs this system is large in size and high in price owing to the need for the step-up transformer 7 of a large capacity.

BRIEF SUMMARY OF THE INVENTION

The present invention discloses an inexpensive and compact operation control apparatus for an AC motor in which braking energy is disposed of by regenerative braking when the speed of the AC motor is reduced.

Accordingly, an object of the present invention is to provide an AC motor operation control apparatus equipped with a regenerative braking circuit which is less expensive and which is capable of being constructed in a much smaller size.

It is another object of the present invention to provide an AC motor operation control apparatus which is capable of regenerative braking without the use of a step-up transformer.

It is still another object of the present invention to provide an AC motor operation control apparatus in which regenerative braking can be achieved inexpensively without an apparatus of a large size.

It is a further object of the present invention to provide an AC motor operation control apparatus in which stable regenerative braking can be achieved by the provision of an overcurrent preventing function.

Other features and advantages of the invention will be apparent from the following description taken in connection with the accompanying drawings.

BRIEF DESCRIPTION OF THE DRAWINGS

FIG. 5 is a waveform diagram of voltage and current associated with the various portions of the circuit shown in FIG. 2 when the regenerative state is discriminated and when regenerative current is discriminated to determine whether such current is excessive.

DETAILED DESCRIPTION OF THE PREFERRED EMBODIMENT

Figure 1:
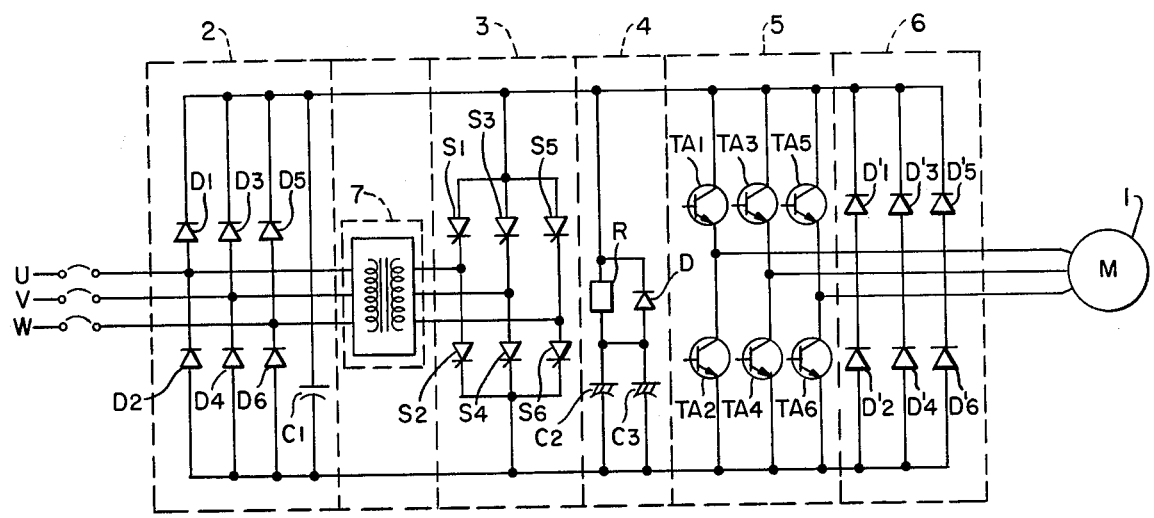
FIG. 1 is a circuit diagram of a regenerative type control apparatus for controlling the operation of an AC motor in accordance with the prior art.
Figure 2:
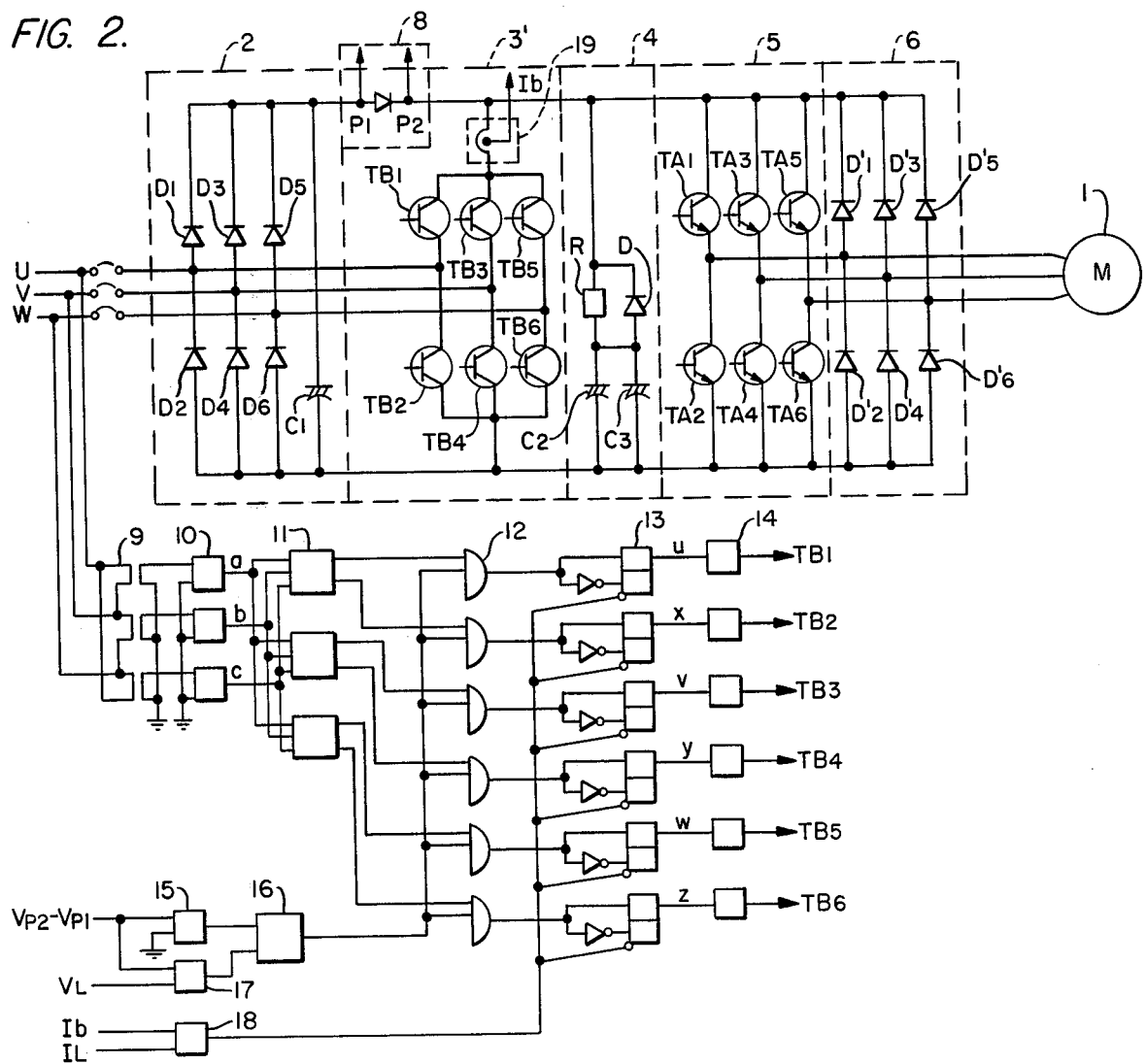
FIG. 2 is a circuit diagram showing an embodiment of an apparatus for controlling the operation of an AC motor in accordance with the present invention.

Reference will now be had to FIG. 2 to describe the circuit of an AC motor operation control apparatus which embodies the present invention. In FIG. 2, the sections denoted by the reference numerals 1, 2, 4, 5 and 6 are identical to those designated by the same reference numerals in FIG. 1. The section denoted by numeral 3' corresponds to the regenerative bridge circuit 3 of FIG. 1 but in this case is a regenerative bridge circuit in which the thyristors $S_1$ through $S_6$ have been substituted by transistors $TB_1$ through $TB_6$. The apparatus of FIG. 2 further includes a regenerative state discriminating diode 8, a delta-Y connected control transformer 9, a comparator circuit 10, a logical circuit 11 which receives three-phase signals from the comparator circuit 9 and which distributes six-phase signals, with the transformer 9 and the circuits 10, 11 constructing a firing control signal forming circuit. Also provided are an AND gate circuit 12 for taking the logical AND between the output signal of the logical circuit 11 and the output signal of a logical circuit 16, the AND gate circuit 12 delivering a six-phase distribution signal together with the outputs of the logical circuits 11 and 16 at one time, a flip-flop circuit 13 for setting the intitial conditions and for resetting the same externally, and an amplifier circuit 14 for amplifying the output of the flip-flop circuit 13 to supply base signals to corresponding ones of the transistors $TB_1$ through $TB_6$ in the regenerative transistor bridge circuit 3', the gate circuit 12, flip-flop circuit 13 and amplifier circuit 14 constructing a circuit for supplying firing control signals. Numeral 15 denotes a comparator circuit for comparing the potential ($V_{p2}-V_{p1}$) developed across the regenerative state discriminating diode 8 with ground potential, the output thereof being coupled to a logical circuit 16. Numeral 17 designates another comparator circuit for comparing the aforesaid potential ($V_{p2}-V_{p1}$) with a reference potential $V_L$, the output thereof being delivered to the logical circuit 16. Another comparator circuit 18 compares a detected regenerative current $I_h$ with a reference current $I_c$ and is adapted to send a reset signal to flip-flop circuit 13 when the regenerative current exceeds a reference value. A current detecting coil 19 detects the regenerative current $I_h$ of the regenerative bridge circuit 3'.

In operation, when the AC motor is running in the ordinary driving mode, the AC power source voltage entering from the U, V and W terminals at the left side of FIG. 2 is rectified by rectifier 2 and applied to the variable-voltage variable-frequency inverter 5 whose transistors are fired successively by a firing circuit, which is not shown, so as to operate the induction motor 1 at a speed which is in accordance with a speed command signal. More specifically, the supply voltage is controlled by regulating the conduction time of the transistors $TA_1$ through $TA_6$ of the inverter 5, and the output frequency of the inverter is controlled by regulating the period of the firing pulses, thereby enabling variable voltage-variable frequency operation. When the speed command is changed to reduce the speed of the induction motor, the newly instructed synchronous speed drops below the speed at which the motor has been rotating up to this time, so that a negative slip condition develops in the motor that causes electric power to be regenerated in the stator winding. The regenerative power causes the smoothing capacitors $C_2$, $C_3$ to charge, thereby raising the voltage on the side of the DC line.

In consequence, a difference is created between the line voltage of the end to which the smoothing capacitors $C_2$ and $C_3$ are connected and the line voltage of the end to which the smoothing capacitor $C_1$ is connected. Accordingly, a potential difference ($V_{p2}-V_{p1}$) between the voltage $V_{p2}$ at the point $P_2$ and the voltage $V_{p1}$ at the point $P_1$ of the regenerative state discriminating diode 8 takes a positive value. From this fact, it is possible to detect that the induction motor is operating in the regenerative mode. It is possible to supply a regenerative current back to the AC power source, in accordance with the voltage difference between the DC voltage and the AC power source voltage, by delivering a firing signal to the transistors connected to the phases of the highest voltage difference between two phases of the AC power source among the transistors $TB_1$ to $TB_6$ constituting the regenerative transistor bridge circuit 3'. In this state, the induction motor operates as a generator to reduce its speed rapidly down to the level of the command speed. This operation will be described in more detail with reference to the firing signal forming circuit consisting of the transistors $TB_1$ to $TB_6$, as well as to FIG. 4 which shows the waveforms of signals at various points in the circuit shown in FIG. 4 in the regenerative operation.

Figure 4:
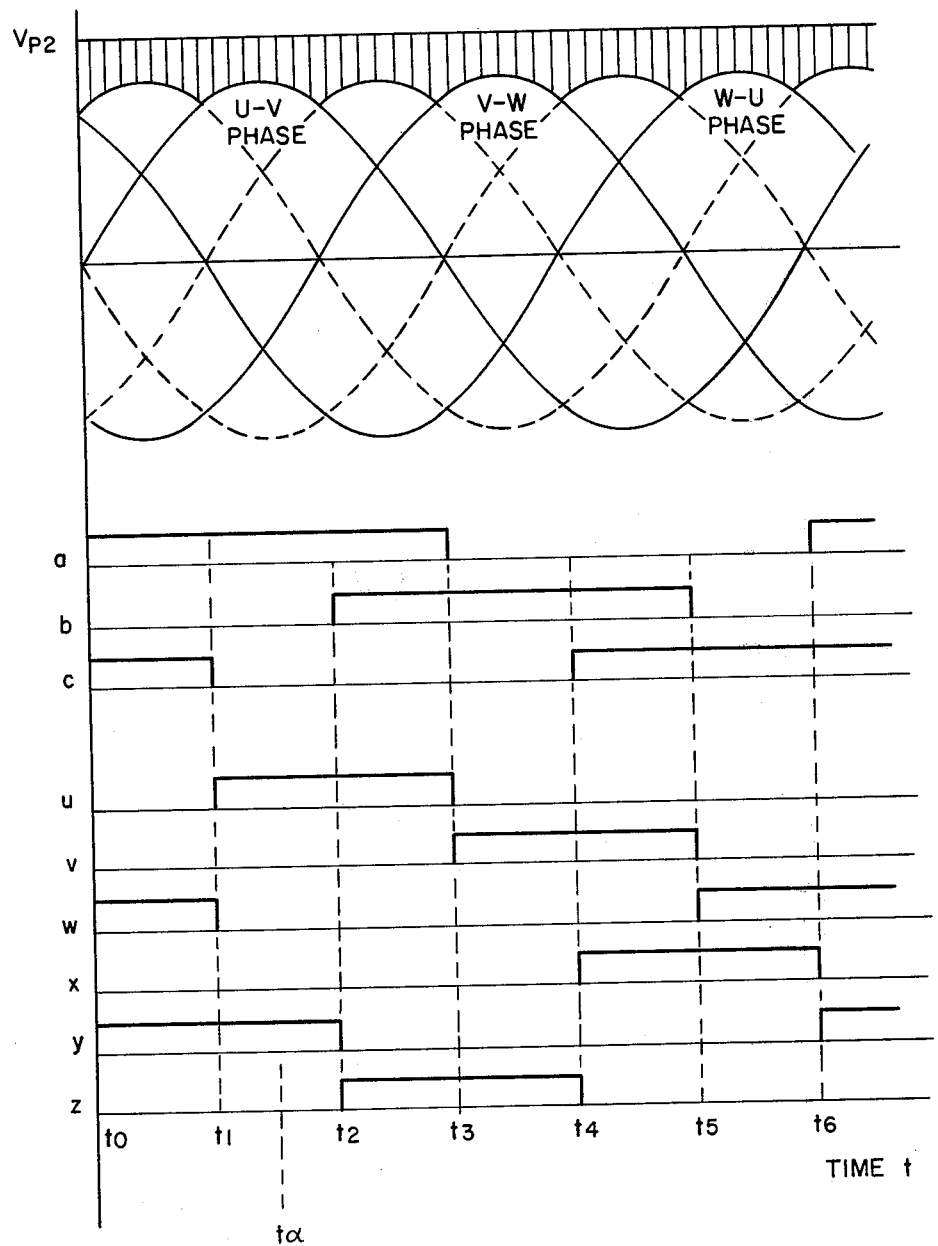
FIG. 4 is a waveform diagram which illustrates waveforms associated with the various portions of the circuit shown in FIG. 2 at the time of a regenerative operation.

Referring to FIG. 4, the voltage at the point $P_2$ of the regenerative state discriminating diode is represented by $V_{p2}$. The sine-wave curves show the line voltages between adjacent phases U, V and W of the AC power source. It will be understood that voltages of positive and negative half waves are applied to the transistors $TB_1$ to $TB_6$ of the regenerative transistor bridge circuit 3' in accordance with the cycles of the AC power source.

Referring again to FIG. 2, sine wave signals $U_2$, $V_2$, $W_2$ are derived from the U, V and W phases in accordance with the pulsation of respective phase voltages, through a controlling transformer 9. These sine wave signals are compared with the ground potential by a comparator circuit 10 and are transformed into rectangular wave signals a, b and c displaced in phase by 120° as shown in FIG. 4. These signals are then delivered to a logical circuit 11 and are changed into six-phase signals of 120° width. This logical circuit 11 may be a known circuit which is used for the formation of a rotor-position signal in a commutator-less motor. Thus, the output signals from the logical circuit 11 corresponds to signals u, v, w and x, y, z shown in FIG. 4.

Figure 3:
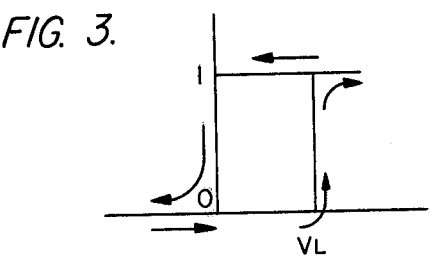
FIG. 3 shows the characteristic of a logical circuit 16 included in the circuit of FIG. 2.

Simultaneously, the voltage generated across the regenerative state discriminating diode 8 is delivered to a differential amplifier, which is not shown, adapted to produce a signal corresponding to the potential difference across two terminals of the diode 8. The signal $V_{p2}-V_{p1}$ corresponding to the potential difference across two terminals of the regenerative state discriminating diode 8 is delivered to comparator circuits 15, 17 adapted to compare the potential difference $V_{p2}-V_{p1}$ with the reference voltage $V_L$ and the ground potential, respectively. A logical circuit 16, having a hysteresis characteristic as shown in FIG. 3, produces a logical output "1" or "0", upon receipt of the deviation signals derived from the comparator circuits 15, 17. This logical circuit 16 may be a combination of a NOR gate and a flip-flop of the R-S type. Specifically, assuming here that the comparator circuit 15 produces a logical output "1" on condition of $(V_{p2}-V_{p1})>0$ and that the comparator circuit 17 produces a logical output "1" on condition of $(V_{p2}-V_{p1})>V_L$, the logical circuit 16 can be formed by directly connecting the output of the comparator 17 to the set terminal of the flip-flop and connecting the output of the comparator 15 to the reset terminal of the flip-flop through a NOT gate.

The logical products of the output from the logical circuit 16 and the distribution signals u, v, w and x, y, z which are the outputs from the logical circuit 11 are obtained through an AND gate 12, and the firing control signal is delivered to the regenerative transistor bridge circuit 3' only after the establishment of the state sufficient for the switching of the operation mode to regenerative operation. The output from the AND gate 12 is supplied to the flip-flop circuit of the next stage to set the initial condition of the firing control signal. In addition, the flip-flop circuit 13 is controlled also by the overcurrent in the regenerative transistor bridge circuit 3'.

More specifically, a regenerative current $I_b$ obtained from the current detection coil 19 and the limit current $I_l$ are compared with each other by a comparator circuit 18. If the regenerative current is increased in excess of the limit current, the flip-flop 13 is reset so that the delivery of the base signals to respective transistors $TB_1$ to $TB_6$ of the regenerative transistor bridge circuit 3' is terminated to turn off the transistor bridge circuit 3' to check the overcurrent. The distribution signal thus derived from the flip-flop circuit 13 is delivered to the transistors $TB_1$ to $TB_6$ of the regenerative transistor bridge circuit 3' as the base currents, after amplification by the amplifier circuit 14. By so doing, it is possible to obtain stable regenerative operation in such a state that the regenerated voltage is high enough for the supply of power back to the power source, and that the regenerative current is smaller than the limit current.

This regenerative operation will be described hereinunder with specific reference to FIG. 4. In the period between the moment $t_0$ and $t_1$, base signals w and y are generated to fire the transistors $TB_5$ and $TB_4$ which are connected to the two phases of the maximum interphase voltage of the power supply, i.e. W and V phases. In the next period between $t_1$ and $t_2$, base signals u and y are formed to fire the transistors $TB_1$ and $TB_4$ connected to the U and V phases. Similarly, the transistors $TB_1$ and $TB_6$, $TB_3$ and $TB_6$, $TB_3$ and $TB_2$ and $TB_5$ and $TB_2$ of the regenerative transistor bridge circuit 3' are turned on in pairs, and the difference between the voltages $V_{p2}$ and $V_{p1}$, i.e. the hatched area in FIG. 4, is stably supplied back to the AC power source. It will be clearly understood from the foregoing description that the regenerative operation is halted without delay when the regenerative current increases beyond the limit current $I_l$ or when the voltage difference $V_{p2}-V_{p1}$ takes on a negative value.

FIG. 5 shows the regenerative period (output period of the flip-flop 13) and the regenerative current $I_b$ in relation to the voltage difference $V_{p2}-V_{p1}$.

As has been described, according to the invention, transistors are used for the elements of a regenerative bridge for an AC motor, so that commutation failure is avoided to eliminate the step-up transformer for commutation which is necessary in the conventional apparatus. At the same time, the size of the apparatus as a whole is advantageously reduced and the economy in the operation of the apparatus is considerably improved.

In addition, a stable regenerative operation is ensured by the detector for detecting the building up of sufficiently high regenerative voltage and by the overcurrent prevention mechanism.

Thus, the present invention provides an operation controlling apparatus for AC motors capable of responding to various load conditions of the AC motors.

What is claimed is:

1. An apparatus for controlling the operation of an AC motor, which apparatus comprises:
   a rectifier connected to an AC power source for converting alternating current into direct current;
   a variable voltage-variable frequency inverter for applying drive signals to the AC motor upon receiving the direct current output of said rectifier, the supply voltage and frequency of said drive signals being varied in accordance with an externally applied command;
   a transistor bridge circuit for regenerative action connected between said inverter and said rectifier, and comprising a plurality of transistors connected in the form of a bridge;
   a smoothing capacitor connected between said transistor bridge circuit and said inverter;
   a diode provided between said rectifier and said transistor bridge circuit and connected to a reverse biasing polarity when the AC motor operates in the regenerative braking region; and
   a firing control circuit for detecting the reverse bias voltage of said diode thereby to control the firing of each transistor in said transistor bridge circuit; braking energy being fed back to the AC power source side.

2. An apparatus for controlling the operation of an AC motor as claimed in claim 1, in which said firing control circuit controls the firing of said transistors of the regenerative transistor bridge circuit in accordance with the regenerative current in said regenerative transistor bridge circuit.

3. An apparatus for controlling the operation of an AC motor as claimed in claim 1, in which said firing control circuit includes a circuit for generating a plurality of firing control signals for controlling respective transistors of said regenerative transistor bridge circuit, and a circuit for supplying said firing control signals to respective transistors of said regenerative transistor bridge circuit in accordance with the reverse bias voltage of said diode.

4. An apparatus for controlling the operation of an AC motor as claimed in claim 3, wherein said circuit for generating said firing control signals is adapted to generate a firing control signal for simultaneously firing a pair of transistors of said regenerative transistor bridge circuit, said pair of transistors being connected to two phases of the maximum interphase voltage from said AC power source.

5. An apparatus for controlling the operation of an AC motor as claimed in claim 3, wherein said firing control circuit includes a circuit for comparing said reverse bias voltage of said diode with a reference voltage, and wherein said circuit for supplying said firing control signals is adapted to supply said firing control signal upon receipt of the output from said circuit for generating said firing control signal and the output from the comparator circuit.

6. An apparatus for controlling the operation of an AC motor as claimed in claim 3, wherein said firing control circuit further includes a comparator circuit adapted to compare said regenerative current in said regenerative transistor bridge circuit with a reference current, the output from said comparator circuit constituting the control input for said circuit for supplying the firing control signal.

7. An apparatus for controlling the operation of an AC motor as claimed in claim 3, wherein said firing control signal forms a six-phase firing control signal upon receipt of three-phase AC power from said AC power source.

8. An apparatus for controlling the operation of an AC motor as claimed in claim 6, wherein said circuit for supplying said firing control signals includes a gate circuit for producing the product of the output from said circuit for generating said firing control signals and the output from said comparator circuit, and flip-flop circuit adapted to hold the output of said gate circuit, said flip-flop circuit being adapted to be reset by the output from the current comparator circuit.

9. An apparatus for controlling the operation of an AC motor as claimed in claim 8, wherein said gate circuit and said flip-flop circuit are arranged in plural, the number of which corresponding to the number of said firing control signals.

* * * * *

UNITED STATES PATENT AND TRADEMARK OFFICE
CERTIFICATE OF CORRECTION

PATENT NO. : 4,319,177
DATED : March 9, 1982
INVENTOR(S) : SHIGEKI KAWADA et al.

It is certified that error appears in the above-identified patent and that said Letters Patent is hereby corrected as shown below:

Front page, after "[22] Filed: Aug. 8, 1980" insert
    on new line:
        --[30] Foreign Application Priority Data
          August 15, 1979 [JP] Japan ...54-103862--.

Front page, [56] References cited, "Fornrumpt" should
    be --Kornrumpf--.

Front page, [57] Abstract, line 7, after "capacitors"
    change "and" to --,--;
        line 8, after "circuit," insert --and--.

Column 2, line 44, "to enable" should be --enabling--.
Column 3, line 30, "had" should be --made--.

Signed and Sealed this

Fifth Day of April 1983

[SEAL]

Attest:

GERALD J. MOSSINGHOFF

Attesting Officer      Commissioner of Patents and Trademarks